US012558957B2

(12) United States Patent
Kabatek et al.

(10) Patent No.: US 12,558,957 B2
(45) Date of Patent: Feb. 24, 2026

(54) METHOD FOR OPERATING A DISPLAY UNIT OF A VEHICLE, AND DISPLAY UNIT

(71) Applicant: Continental Automotive GmbH, Hannover (DE)

(72) Inventors: Ulrich Kabatek, Babenhausen (DE); Kai Hohmann, Babenhausen (DE)

(73) Assignee: CONTINENTAL AUTOMOTIVE TECHNOLOGIES GMBH, Hannover (DE)

( * ) Notice: Subject to any disclaimer, the term of this patent is extended or adjusted under 35 U.S.C. 154(b) by 227 days.

(21) Appl. No.: 17/785,127

(22) PCT Filed: Dec. 17, 2020

(86) PCT No.: PCT/EP2020/086638
§ 371 (c)(1),
(2) Date: Jun. 14, 2022

(87) PCT Pub. No.: WO2021/122891
PCT Pub. Date: Jun. 24, 2021

(65) Prior Publication Data
US 2023/0011848 A1     Jan. 12, 2023

(30) Foreign Application Priority Data

Dec. 18, 2019    (DE) ..................... 10 2019 220 012.5

(51) Int. Cl.
*B60K 35/10*        (2024.01)
*B60K 35/22*        (2024.01)
(Continued)

(52) U.S. Cl.
CPC ............. *B60K 35/10* (2024.01); *B60K 35/22* (2024.01); *B60K 35/50* (2024.01); *B60K 35/81* (2024.01);
(Continued)

(58) Field of Classification Search
None
See application file for complete search history.

(56) References Cited

U.S. PATENT DOCUMENTS 10,319,272 B1 *   6/2019   Carter .................... B60K 35/53
2001/0040534 A1 *  11/2001   Ohkawara ................ G09G 5/00
                                                    345/7
(Continued)

FOREIGN PATENT DOCUMENTS

DE          10339314 B3      4/2005
DE     102012204303 A1      9/2013
(Continued)

OTHER PUBLICATIONS

Search Report dated Nov. 3, 2020 from corresponding German patent application No. 10 2019 220 012.5.
(Continued)

*Primary Examiner* — James J Lee
*Assistant Examiner* — Melanie G Huber
(74) *Attorney, Agent, or Firm* — Buchanan Ingersoll & Rooney PC

(57) ABSTRACT

A method for operating a display unit of vehicle, wherein the display unit displays at least one display, comprises ascertaining the viewing direction of a driver using a gaze-tracking device; checking whether the viewing direction of the driver is directed at the display unit; checking whether traffic-relevant data are present; operating the display unit in an energy-saving mode when the view of the driver is not directed at the display unit and/or when no traffic-relevant data is present; and operating the display unit in a display mode when the view of the driver is directed at the display unit and/or when traffic-relevant data is present for display. A display unit is also disclosed.

13 Claims, 3 Drawing Sheets

(51) Int. Cl.

| | |
|---|---|
| *B60K 35/23* | (2024.01) |
| *B60K 35/29* | (2024.01) |
| *B60K 35/50* | (2024.01) |
| *B60K 35/81* | (2024.01) |

(52) U.S. Cl.
CPC .............. *B60K 35/23* (2024.01); *B60K 35/29* (2024.01); *B60K 2360/1868* (2024.01); *B60K 2360/349* (2024.01)

(56) References Cited

U.S. PATENT DOCUMENTS

| | | | |
|---|---|---|---|
| 2009/0040196 A1 | 2/2009 | Duckstein et al. | |
| 2014/0129082 A1 | 5/2014 | Takahashi et al. | |
| 2015/0002381 A1* | 1/2015 | Fujioka ................ | G09G 3/3614 345/87 |
| 2015/0095350 A1* | 4/2015 | Chen ........................ | G06F 16/29 707/755 |
| 2015/0175106 A1* | 6/2015 | Frommann .............. | B60Q 3/18 701/36 |
| 2016/0185220 A1* | 6/2016 | Mere ....................... | B60K 35/28 340/438 |
| 2019/0361233 A1* | 11/2019 | Ogawa ............... | G02B 27/0101 |
| 2020/0238825 A1* | 7/2020 | Lerzer .................... | B60K 35/22 |
| 2021/0055548 A1* | 2/2021 | Rao ........................ | G06T 19/006 |
| 2021/0132689 A1* | 5/2021 | Yudanov ............... | G06F 3/0488 |
| 2021/0197724 A1* | 7/2021 | Gu ........................ | G06V 40/171 |

FOREIGN PATENT DOCUMENTS

| | | |
|---|---|---|
| DE | 102012206030 A1 | 10/2013 |
| DE | 102012019507 A1 | 4/2014 |
| DE | 102012020170 A1 | 4/2014 |
| DE | 102014206569 A1 | 10/2015 |
| DE | 102015215180 A1 | 2/2017 |
| DE | 102017213177 A1 | 1/2019 |

OTHER PUBLICATIONS

International Search Report and Written Opinion dated Mar. 22, 2021 from corresponding International patent application No. PCT/EP2020/086638.

* cited by examiner

METHOD FOR OPERATING A DISPLAY UNIT OF A VEHICLE, AND DISPLAY UNIT

CROSS-REFERENCE TO RELATED APPLICATION

This U.S. patent application claims the benefit of PCT patent application No. PCT/EP2020/086638, filed Dec. 17, 2020, which claims the benefit of German patent application No. 10 2019 220 012.5, filed Dec. 18, 2019, both of which are hereby incorporated by reference.

TECHNICAL FIELD

The disclosure relates to a method for operating a display unit of a vehicle and to a display unit.

BACKGROUND

Display units are increasingly being employed in vehicles for a very wide range of functions. They are not only used as a pure information device and navigation device, but also for control. For this reason, increasingly large display units are being implemented. Corresponding to the total area there is a large display unit that is to be illuminated by a backlight unit.

DE 103 393 14 B3 discloses a method in which the current viewing direction of the driver is continuously automatically detected, and the drive-relevant information is only displayed for the driver with almost no delay when the driver has viewing contact with the dual-view display, whereas, in the intervals when there is no viewing contact, alternative information, not drive-relevant, can be displayed, wherein the current viewing direction is ascertained by a video-based detection of the head movement and/or eye movement of the driver on the basis of a static or dynamic detection method, and only a binary decision is made in the evaluation as to whether the driver is or is not looking at the dual-view display.

It is an object of the disclosure to provide a method and a display unit that enable an improved operation of the vehicle.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

BRIEF SUMMARY

A method for operating a display unit of vehicle, wherein the display unit displays at least one display, comprises ascertaining the viewing direction of a driver with a gaze-tracking device, checking whether the viewing direction of the driver is directed at the display unit, checking whether traffic-relevant data is present, operating the display unit in an energy-saving mode when the view of the driver is not directed at the display unit and/or when no traffic-relevant data is present, and operating the display unit in a display mode when the view of the driver is directed at the display unit and/or when traffic-relevant data is present for display.

The acquisition system may, for example, be a camera that evaluates the viewing direction of the driver with the aid, for example, of a control unit. In this way it is possible to establish whether the driver is looking at the display unit.

The driver here can also include the passenger.

In accordance with the disclosure it is recognized that the backlighting of larger display units requires a significant quantity of energy. Unwanted waste heat is, furthermore, also generated. A further point is that driving the displays also requires high performance from the corresponding graphics unit, which also generates waste heat.

A reduction in the energy/current consumption and of the waste heat of the display unit is achieved by the method according to the disclosure. The display unit, moreover, is less strongly heated, which entails a significant advantage from the point of view of a possible installation position of the display unit. Thus, for example, only a little heat is generated by operation of the display unit itself in addition to incoming solar radiation. A longer service life of the display unit may also be achieved.

Due to the method according to the disclosure, what is known as "derating" is only needed at a much later stage, since the self-heating of the display unit is significantly reduced by the operation depending on the viewing direction.

In an embodiment, when changing from the display mode into the energy-saving mode, the brightness of the display is reduced, and on changing from the energy-saving mode into the display mode, the brightness of the display is increased. A backlight unit may be controlled specifically by pulse drive (overcurrent) for this purpose in such a way that the backlight, and thus the display, is brightened considerably so that readability is improved when the driver's viewing direction is directed at the display unit and/or when traffic-relevant data is present.

In an embodiment, the display unit furthermore has a dimming function, in which the change from the energy-saving mode into the display mode is done smoothly using the dimming function when the view of the driver is directed to the display unit. A sudden increase could otherwise be perceived as "movement" that could affect the attention of the driver or even startle him. As a result it would be possible that the driver could be distracted from the traffic, or that the start could lead to "jerking" the steering wheel. "Jerking" here means that the driver abruptly turns the steering wheel of the vehicle, so that the vehicle's path differs from the original path.

In addition, the self-heating of the display unit is further reduced through dimming that depends on the viewing direction.

In an embodiment, the display unit has a dimming function, in which the change from the energy-saving mode into the display mode is done smoothly using the dimming function when traffic-relevant data is present for display. Here again, startling the driver may be avoided.

In an embodiment, the change from the energy-saving mode into the display mode furthermore occurs suddenly if traffic-relevant data is present for display. The attention of the driver may in this way be drawn to the display unit.

The type of the change is dependent on a traffic situation acquired by vehicle sensors; if the vehicle sensors, or the control unit, detect a critical traffic situation on the basis of the traffic situation acquired by the vehicle sensors, then a smooth change from the energy-saving mode into the display mode is made by the dimming function.

If a critical traffic situation is not present, then the change from the energy-saving mode into the display mode may take place suddenly when traffic-relevant data for display are present, and thus draw the attention of the driver/passenger to the display unit.

In an embodiment, the traffic-relevant data comprise a changed traffic situation. This may, for example, be a changed traffic situation, such as roadworks or a traffic jam. In this case, the traffic-relevant data can, for example, be received over a Car-to-X/Car-to-Car communication channel. The traffic situation may also, for example, relate to weather conditions, for example in the event of sudden black ice.

In an embodiment, the traffic-relevant data comprise vehicle-relevant data. This may, for example, be information relating to a leakage of oil or brake fluid, or the failure, for example, of a sensor.

In an embodiment, the traffic-relevant data comprise driver-relevant data. This may, for example, be suddenly occurring driver tiredness, which may also be acquired with the gaze-tracking device.

In an embodiment, when changing from the display mode into the energy-saving mode, the quality of the display is reduced, and on changing from the energy-saving mode into the display mode, the quality of the display is increased. The quality of the graphical content may be reduced in that, for example, "fuzzier" contents with a poorer resolution are generated, and scaled up accordingly.

The quality includes the resolution of the display. In an embodiment, the display unit, when changing from the display mode into the energy-saving mode, the resolution of the display is reduced as the quality, and on changing from the energy-saving mode into the display mode, the resolution of the display is increased as the quality. This reduction is easy to realize.

The quality includes the refresh rate of the display. In an embodiment, the display unit, when changing from the display mode into the energy-saving mode, the refresh rate of the display is reduced as the quality, and on changing from the energy-saving mode into the display mode, the refresh rate of the display is increased as the quality. The refresh rate may be understood to refer to the rate at which the content of the display is updated. This reduction is also easy to realize.

The quality includes the contrast of the display. In an embodiment, the display unit, when changing from the display mode into the energy-saving mode, the contrast of the display is reduced as the quality, and on changing from the energy-saving mode into the display mode, the contrast of the display is increased as the quality. This reduction is also easy to realize.

According to another aspect, a display unit for a vehicle comprises a gaze-tracking device for acquiring the viewing direction of the driver and a control unit for checking whether the viewing direction of the driver is directed at the display unit, and whether traffic-relevant data are present, wherein the control unit is furthermore configured such that when the view of the driver is not directed at the display unit and/or when no traffic-relevant data are present, the display unit is operated in an energy-saving mode and the display unit is operated in display mode when the view of the driver is directed to the display unit and/or when traffic-relevant data for display are present.

The display unit here is, for example, designed to carry out the method according to the disclosure.

The control unit may be for example the control device (ECU) of the vehicle.

The gaze-tracking device is, for example, a camera, for example a front camera.

The consumption of energy both for the backlighting unit and for the operation is, for example, a problem in electrically operated vehicles. The current consumption here has the direct effect of a reduced range. A reduction in the energy, current consumption and of the waste heat of the display unit is achieved by the display unit according to the disclosure.

In an embodiment, the display unit comprises a backlight unit for backlighting, wherein the control unit is designed when changing from the display mode into the energy-saving mode, to reduce the brightness of the backlighting and, when changing from the energy-saving mode into the display mode, to increase the brightness of the backlighting.

In an embodiment, the backlight unit comprises a dimming controller, wherein the control unit is designed to increase the brightness of the backlighting by means of the dimming controller smoothly when the view of the driver is directed at the display unit.

The brightness of the backlighting may be reduced and increased smoothly by the control unit by the dimming controller. This is not to be done suddenly, as it can otherwise be perceived as a "movement" that draws the attention of the driver to the display unit and distracts him from traffic events/the current traffic situation.

The change from the energy-saving mode into the display mode occurs suddenly if traffic-relevant data is present for display.

The traffic-relevant data may comprise a changed traffic situation and/or vehicle-relevant data and/or driver-relevant data.

In an embodiment, the control unit is designed, when changing from the display mode into the energy-saving mode, to reduce the quality of the display, and on changing from the energy-saving mode into the display mode, to increase the quality of the display.

In an embodiment, the display unit is designed as a display, for example, as a head-up display. The display may, for example, be part of an instrument cluster.

Other objects, features and characteristics of the present disclosure, as well as the methods of operation and the functions of the related elements of the structure, the combination of parts and the economics of manufacture will become more apparent upon consideration of the following detailed description and appended claims with reference to the accompanying drawings, all of which form a part of this specification. It should be understood that the detailed description and specific examples, while indicating an embodiment of the disclosure, are intended for purposes of illustration only and are not intended to limit the scope of the disclosure.

BRIEF DESCRIPTION OF THE DRAWINGS

The present disclosure will become more fully understood from the following description with reference to the accompanying figures, in which, schematically.

DETAILED DESCRIPTION

Although the disclosure has been more specifically illustrated and described in detail by embodiments, the disclosure is not restricted by the examples disclosed.

Figure 1:
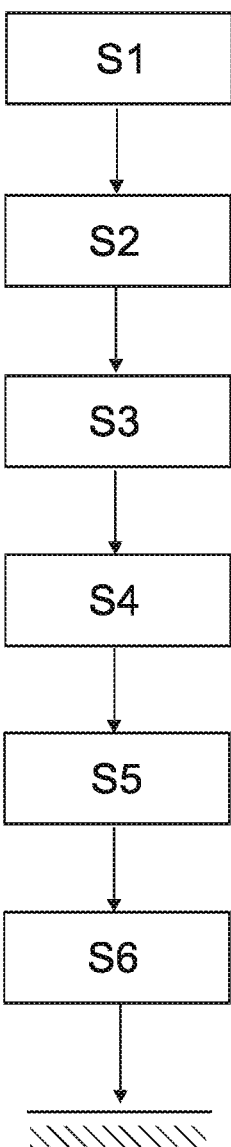
FIG. 1 shows a first design of the method.

FIG. 1 shows the method according to the disclosure in a first embodiment.

The viewing direction of the driver is ascertained here in a first step S1. This is achieved with the aid of a gaze-tracking device 1 (FIG. 3), wherein the gaze-tracking device 1 (FIG. 3) is, for example, embodied as a front camera. This gaze-tracking device 1 (FIG. 3) is arranged at the height of the driver, for example at or in the rear-view mirror, or in the region of the windscreen, and is directed toward the direction of the driver or, possibly, in the direction of the passenger. The gaze-tracking device 1 (FIG. 3) may generate recordings in the visible band and, preferably, in the infra-red band. The viewing direction can also be acquired at night by using infra-red radiation. The gaze-tracking device 1 (FIG. 3) is connected to a computing unit, for example a control device 2 (FIG. 3), that analyses the recordings by an image analysis method and determines a respective viewing direction of the driver or of the passenger, if relevant. This is determined with reference to the acquired pupils of the eyes of the driver or, if relevant, of the passenger.

Figure 3:
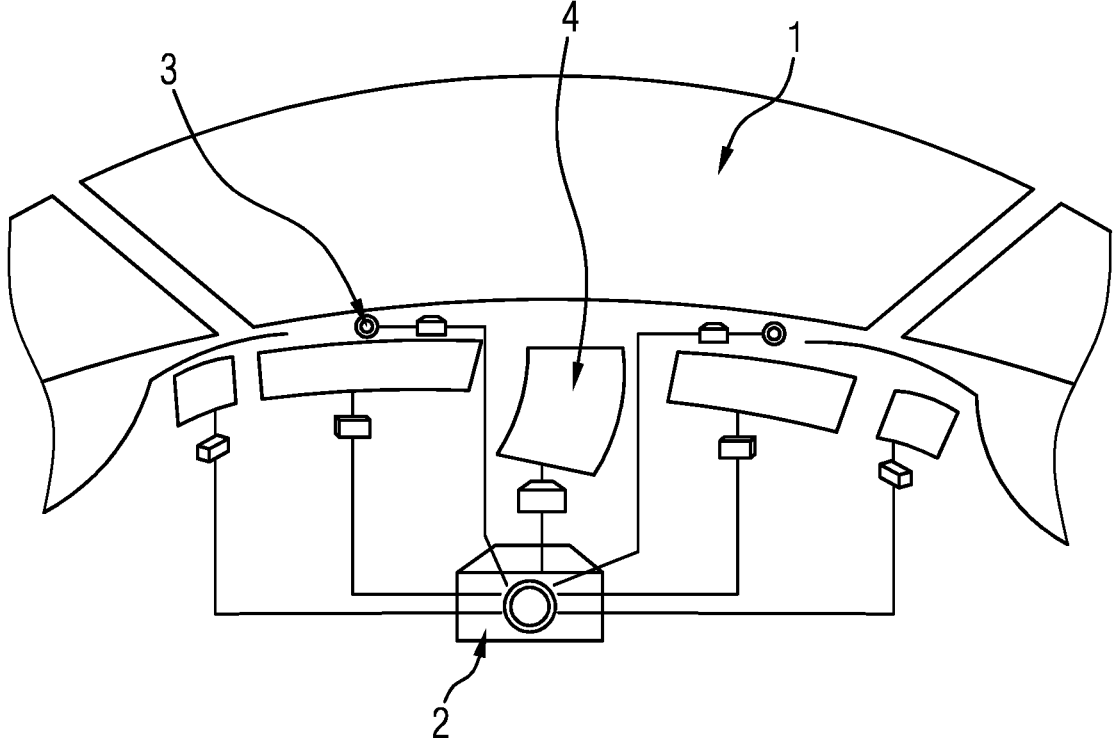
FIG. 3 shows a display unit according to the disclosure in a vehicle.

An examination is made in a second step S2 as to whether the viewing direction of the driver or, if relevant, of the passenger, is directed to the display unit 4 (FIG. 3).

In a third step S3, an examination is made as to whether traffic-relevant data are present. These may, for example, relate to the traffic situation, for example a traffic jam, which is ascertained via a Car-to-X or Car-to-Car communication channel. These may also be vehicle-relevant data, such as an oil leak, failure of a safety system or other system, over-heating of the system, water level that is too low, and so forth. Traffic-relevant data may also relate to the driver, and may be configured as driver-relevant data. These may, for example, be increased fatigue, which may also be ascertained with the gaze-tracking device 1 (FIG. 3). This may also be an increased heart rate, which may be ascertained with appropriate sensors, or by establishing unfitness to drive on the basis of the driver's driving style.

In a fourth step S4, the display unit 4 (FIG. 3) is switched from the energy-saving mode into the display mode if the driver directs or has directed his view to the display unit 4 (FIG. 3) and/or if traffic-relevant data is present. The back-lighting is increased here in display mode, so that the display itself becomes brighter. The quality of the display is, fur-thermore, increased. The contrast, the resolution and the refresh rate of the display may preferably be used as the quality. The type of switch-over may differ here: with a viewing direction to the display unit 4 (FIG. 3), then at least the brightness is raised smoothly from the energy-saving mode up to the display mode by a dimming controller, while the display unit 4 (FIG. 3) is, in terms of quality, for example switched immediately from the energy-saving mode to the display mode. This avoids the possibility that a sudden brightening of the display may be perceived as "movement", which calls for attention and thus might distract the driver from traffic events.

It is to be noted that embodiments may exist in which both—the quality and the brightness—may be switched smoothly or immediately from the energy-saving mode into the display mode (and vice versa).

In the presence of traffic-relevant data, a sudden change from the energy-saving mode into the display mode is brought about. As a result, for example, of the sudden increase in the brightness, the attention of the driver is directed to the display unit 4 (FIG. 3), so that the driver may read or see the traffic-relevant data on display. This may be done depending on the traffic situation that has been acquired. If a critical traffic situation is recognized through sensor data acquired by sensors and evaluated by a control device 2 (FIG. 3), a sudden change from the energy-saving mode into the display mode may be omitted.

In a fifth step S5, it is recognized on the basis of the gaze-tracking device 1 (FIG. 3) that the driver has with-drawn his view from the display unit 4 (FIG. 3). It is furthermore established that no more traffic-relevant data is present.

In a sixth step S6, the display unit 4 (FIG. 3) is taken out of the display mode and placed in the energy-saving mode. This is done by reducing the backlighting by means of the dimming controller, so that the brightness of the display is reduced. The quality of the display is, furthermore, reduced.

In this energy-saving mode, the energy/current consump-tion and the waste heat from the display unit 4 (FIG. 3) are reduced. The display unit 4 (FIG. 3), moreover, is less strongly heated, which entails a significant advantage in terms of a possible installation position of the display unit 4 (FIG. 3). This display unit 4 (FIG. 3) can now also be installed at positions that are exposed to greater incoming solar radiation. The backlighting, moreover, may be increased through deliberate pulse drive (overcurrent). What is known as derating at higher temperatures is therefore not necessary until much later.

Figure 2:
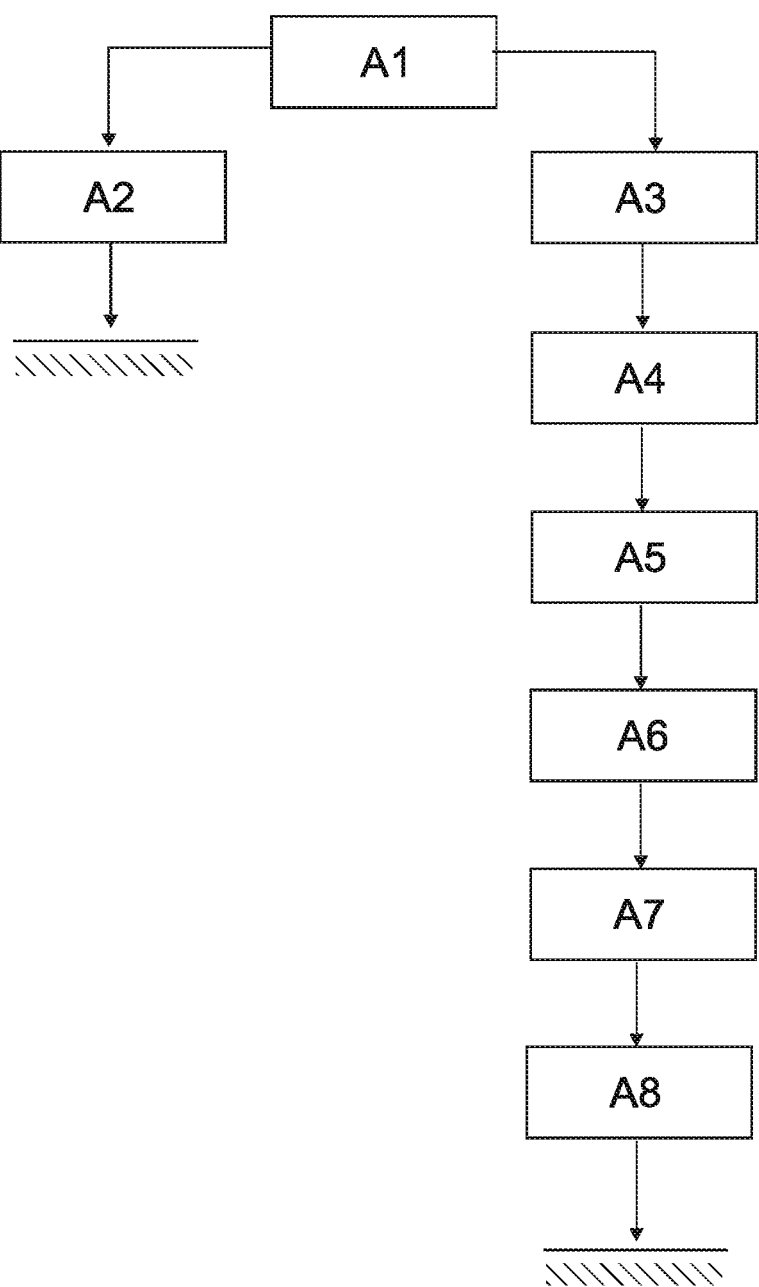
FIG. 2 shows a second design of the method.

FIG. 2 shows a further method according to the disclosure in a second design.

In a first step A1, the driver manually queries or sets the display unit 4 (FIG. 3) whether the method according to the disclosure should be used. This query can also be repre-sented in that the driver retains the current setting in each case, and only changes the setting of the display unit 4 (FIG. 3) in such a way that the method according to the disclosure should be used when a change is desired. If, for example, the driver is driving alone, he may activate the method or retain activation, whereas with passengers, such as children, for example, he may deactivate it or not activate it.

In a second step A2, the method is deactivated by the driver, or is not activated, and thus ends.

In an alternative third step A3, the method is continued as in FIG. 1, and the viewing direction of the driver is ascer-tained.

An examination is made in a fourth step A4 as to whether the viewing direction of the driver or is directed to the display unit 4 (FIG. 3).

In a fifth step A5, an examination is made as to whether traffic-relevant data are present.

In a sixth step A6, the display unit 4 (FIG. 3) is switched from the energy-saving mode into the display mode if the driver directs or has directed his view to the display unit 4 (FIG. 3) and/or if traffic-relevant data is present.

In a seventh step A7, it is recognized on the basis of the gaze-tracking device 1 (FIG. 3) that the driver has with-drawn his gaze from the display unit 4 (FIG. 3). It is furthermore established that no more traffic-relevant data is present.

In an eighth step A8, the display unit 4 (FIG. 3) is taken out of the display mode and placed in the energy-saving mode.

FIG. 3 shows a first configuration of a display unit 4 according to the disclosure.

This comprises a gaze-tracking device 1 that is imple-mented, for example, as a front camera with an eye-tracking sensor for a vehicle. The gaze-tracking device 1 may, for example, be mounted in or at the rear-view mirror.

The gaze-tracking device 1 comprises a pivoting appara-tus 3 in order to fasten the gaze-tracking device 1 in a pivoting manner, so that a viewing direction of an objective lens of the gaze-tracking device 1 may be changed.

As a control unit, the vehicle comprises a control device 2, which is connected to the gaze-tracking device 1. The control device 2 evaluates the recordings taken by the gaze-tracking device 1, and initiates a pivoting of the gaze-tracking device 1 in order to determine the viewing direction of the driver.

The control device 2 is also connected to the display unit 4, in order to control this on the basis of the acquired data. The control device 2 is, furthermore, connected to various communication channels and/or other acquisition systems for acquiring the surroundings. An analysis unit is used to evaluate the viewing direction of the driver or of the passenger, if present. The control device 2 here can comprise a plurality of individual, mutually interconnected control devices.

The display unit 4 as a display may, for example, be designed as a head-up display.

The invention claimed is:

1. A method for operating a display unit of the vehicle, wherein the display unit displays at least one display, comprising:
    ascertaining the viewing direction of a driver with a gaze-tracking device; checking whether the viewing direction of the driver is directed at the display unit;
    checking whether traffic-relevant data is present;
    operating the display unit in an energy-saving mode having a reduced brightness when the view of the driver is not directed at the display unit and when no traffic-relevant data is present;
    operating the display unit in a display mode having an increased brightness when the view of the driver is directed at the display unit and when traffic-relevant data is present for display;
    wherein the display unit has a dimming function, in which the change from the energy-saving mode into the display mode is done smoothly,
    wherein the change from the energy-saving mode into the display mode is performed after the driver manually sets the display unit to change from the energy saving mode into the display mode based on the ascertained viewing direction of the driver such that (i) the change from the energy-saving mode into the display mode is performed using the dimming function when the view of the driver is directed toward the display unit and (ii) the change from the energy-saving mode into the display mode is done immediately when the view of the driver is directed away from the display unit in order to direct the view of the driver to the display.

2. The method as claimed in claim 1, wherein the traffic-relevant data comprise a changed traffic situation.

3. The method as claimed in claim 1, wherein the traffic-relevant data comprise vehicle-relevant data.

4. The method as claimed in claim 1, wherein the traffic-relevant data comprise driver-relevant data.

5. The method as claimed in claim 1, wherein in the display unit, when changing from the display mode into the energy-saving mode, the quality of the display is reduced, and on changing from the energy-saving mode into the display mode, the quality of the display is increased.

6. The method as claimed in claim 5, wherein in the display unit, when changing from the display mode into the energy-saving mode, the resolution of the display is reduced as the quality, and on changing from the energy-saving mode into the display mode, the resolution of the display is increased as the quality.

7. The method as claimed in 5, wherein in the display unit, when changing from the display mode into the energy-saving mode, the refresh rate of the display is reduced as the quality, and on changing from the energy-saving mode into the display mode, the refresh rate of the display is increased as the quality.

8. The method as claimed in claim 5, wherein in the display unit, when changing from the display mode into the energy-saving mode, the contrast of the display is reduced as the quality, and on changing from the energy-saving mode into the display mode, the contrast of the display is increased as the quality.

9. A display unit for a vehicle comprising:
    a gaze-tracking device for acquiring the viewing direction of the driver and a control unit for checking whether the viewing direction of the driver is directed at the display unit, and whether traffic-relevant data are present, wherein the control unit is furthermore configured such that when the view of the driver is not directed at the display unit and when no traffic-relevant data are present, the display unit is operated in an energy-saving mode having a reduced brightness, and the display unit is operated in display mode having an increased brightness when the view of the driver is directed to the display unit and when traffic-relevant data for display are present, wherein the display unit further comprises a backlight unit for backlighting, wherein the backlight unit further comprises a dimming controller, wherein the control unit is designed to increase the brightness of the backlighting by the dimming controller smoothly, wherein a change from the energy-saving mode into the display mode is performed after the driver manually sets the display unit to change from the energy saving mode into the display mode based on the acquired viewing direction of the driver such that (i) the change from the energy-saving mode to the display mode is performed using the dimming controller when the view of the driver is directed toward the display unit and (ii) a change from the energy-saving mode into the display mode is done immediately when the view of the driver is directed away from the display unit in order to direct the view of the driver to the display.

10. The display unit as claimed in claim 9, wherein the control unit designed is, when changing from the display mode into the energy-saving mode, to reduce the quality of the display, and on changing from the energy-saving mode into the display mode, to increase the quality of the display.

11. The display unit as claimed in claim 9, wherein the display unit as a display is a head-up display.

12. The method as claimed in claim 1, wherein the change from the energy-saving mode into the display mode is done immediately only when the traffic-relevant data comprise non-critical traffic information.

13. The display unit as claimed in claim 9, wherein the control unit is designed to increase the brightness of the backlighting immediately only when the traffic-relevant data comprise non-critical traffic information.

\* \* \* \* \*